(12) United States Patent
Tseng et al.

(10) Patent No.: US 9,158,164 B2
(45) Date of Patent: Oct. 13, 2015

(54) PIXEL ARRAY SUBSTRATE AND DISPLAY PANEL

(75) Inventors: Chin-An Tseng, Taipei (TW); Sheng-Ju Ho, Hsinchu (TW); Tien-Lun Ting, Taichung (TW); Cheng-Han Tsao, New Taipei (TW); Ming-Yung Huang, Changhua County (TW); Yen-Heng Huang, Taoyuan County (TW); Pei-Chun Liao, Changhua County (TW); Wen-Hao Hsu, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 995 days.

(21) Appl. No.: 13/301,783

(22) Filed: Nov. 22, 2011

(65) Prior Publication Data
US 2012/0127067 A1    May 24, 2012

(30) Foreign Application Priority Data

Nov. 22, 2010 (TW) ................................. 99140198 A
Oct. 19, 2011 (TW) ............................. 100137888 A

(51) Int. Cl.
*G02F 1/1362* (2006.01)
*G02F 1/1343* (2006.01)
(Continued)

(52) U.S. Cl.
CPC .......... *G02F 1/134336* (2013.01); *G02B 27/26* (2013.01); *G02F 1/13624* (2013.01);
(Continued)

(58) Field of Classification Search
CPC .................. G02F 2001/134345; G02F 1/13624
USPC ......................................................... 349/144
See application file for complete search history.

(56) References Cited

U.S. PATENT DOCUMENTS 8,004,626 B2    8/2011 Ting et al.
2006/0243979 A1* 11/2006 Park et al. ........................ 257/59
(Continued)

FOREIGN PATENT DOCUMENTS

CN   101303500 A   11/2008
CN   101762914 A    6/2010
(Continued)

OTHER PUBLICATIONS

"First Office Action of China Counterpart Application", issued on Dec. 31, 2013, p. 1-p. 8.
(Continued)

*Primary Examiner* — Edward Glick
*Assistant Examiner* — Alexander Gross
(74) *Attorney, Agent, or Firm* — Jianq Chyun IP Office

(57) ABSTRACT

A pixel array substrate and a display panel are provided. The pixel array substrate includes a substrate, scan line groups, data lines, and pixel structures. The scan line groups are disposed on the substrate. The data lines are intersected with the scan line groups. The pixel structures are connected to the scan line groups and the data lines. Each pixel structure includes an active device group, a first pixel electrode, a second pixel electrode, and a connection electrode. The first pixel electrode is located between the second pixel electrode and the $n^{th}$ scan line group. The connection electrode is located at a side of the first pixel electrode adjacent to one data line. The second pixel electrode is electrically connected to the active device group through the connection electrode. The connection electrode, the first pixel electrode, and the second pixel electrode are of the same layer.

18 Claims, 9 Drawing Sheets

(51) Int. Cl.
    *G02F 1/1335*     (2006.01)
    *G09G 3/00*     (2006.01)
    *G09G 3/36*     (2006.01)
    *G02B 27/26*     (2006.01)

(52) U.S. Cl.
    CPC .............. *G02F1/133512* (2013.01); *G02F 2001/134345* (2013.01); *G09G 3/003* (2013.01); *G09G 3/3659* (2013.01); *G09G 2300/0443* (2013.01); *G09G 2300/0809* (2013.01)

(56) References Cited

U.S. PATENT DOCUMENTS

| | | | |
|---|---|---|---|
| 2010/0015363 A1* | 1/2010 | Chiang et al. | 428/1.2 |
| 2010/0195034 A1* | 8/2010 | Lee et al. | 349/124 |
| 2010/0225842 A1* | 9/2010 | Hur et al. | 349/48 |
| 2010/0231845 A1* | 9/2010 | Seong et al. | 349/183 |
| 2010/0238546 A1* | 9/2010 | Hsu et al. | 359/465 |
| 2010/0253869 A1* | 10/2010 | Ting et al. | 349/48 |
| 2011/0156993 A1 | 6/2011 | Ting et al. | |

FOREIGN PATENT DOCUMENTS

| | | |
|---|---|---|
| CN | 102110685 A | 6/2011 |
| CN | 102540598 | 7/2012 |
| TW | 496967 | 8/2002 |
| TW | 201003250 | 1/2010 |
| TW | 201037431 | 10/2010 |

OTHER PUBLICATIONS

"Office Action of Taiwan Counterpart Application", issued on Aug. 18, 2014, p. 1-p. 7.
"First Office Action of China Counterpart Application", issued on Dec. 4, 2012, p. 1-p. 3.

\* cited by examiner

PIXEL ARRAY SUBSTRATE AND DISPLAY PANEL

CROSS-REFERENCE TO RELATED APPLICATION

This application claims the priority benefit of Taiwan application serial no. 99140198, filed on Nov. 22, 2010. This application also claims the priority benefit of a Taiwan application serial no. 100137888, filed on Oct. 19, 2011. The entirety of each of the above-mentioned patent applications is hereby incorporated by reference herein and made a part of this specification.

BACKGROUND OF THE INVENTION

1. Field of the Invention

The invention relates to a pixel structure and a display panel, and particularly to a pixel structure and a display panel that can be applied for three-dimensional (3D) display technology.

2. Description of Related Art

Nowadays, the market demands the liquid crystal display (LCD) panel to develop its functions towards high contrast ratio, no gray scale inversion, little color shift, high luminance, full color, high color saturation, high response speed, and wide viewing angle. Currently, the technologies capable of fulfilling the demands of wide viewing angle include the twist nematic (TN) LCD having a wide viewing film, the in-plane switching (IPS) LCD, the fringe field switching (FFS) LCD, and the multi-domain vertically aligned (MVA) LCD.

However, besides high resolution and high color saturation, in order to satisfy the need of viewers to view realistic images, displays which are capable of displaying 3D images have been developed. The technology of 3D display can be roughly categorized into two types. One is the stereoscopic type which requires a viewer to wear specially designed glasses, and the other is the auto-stereoscopic type which allows the viewer to watch 3D images directly with naked eyes. The glasses used in the stereoscopic type 3D display technology can include color filter glasses, polarizing glasses, shutter glasses, and so forth. According to the stereoscopic type 3D display technology, a display emits light of different images with specific information to the left and the right eyes of the viewer through the glasses, and the images are combined to form a 3D image.

When seeing a 3D image through glasses, the quality of the image seen by the viewer is highly dependable on the viewing angle which is limited by the position of the viewer. Hence, how to lower the restriction of the viewing angle for 3D displays, and increase the viewing angle has become a focus in developing 3D displays.

SUMMARY OF THE INVENTION

The invention provides a pixel array substrate, disposing opaque structures between adjacent pixel structures, to raise the display aperture ratio of the pixel array substrate.

The invention provides a display panel, having 3D display functions and a good display aperture ratio.

The invention provides a pixel array substrate, including a substrate, a plurality of scan line groups, a plurality of data lines, and a plurality of pixel structures. The scan line groups are disposed on the substrate, and the data lines are intersected with the scan line groups. The pixel structures are electrically connected to the scan line groups and the data lines, wherein each of the pixel structures includes an active device group, a first pixel electrode, a second pixel electrode, and a connection electrode. The active device group is electrically connected to an $n^{th}$ scan line group and an $m^{th}$ data line, wherein n and m are both positive integers. The first pixel electrode is electrically connected to the active device group. The second pixel electrode is electrically connected to the active device group, and the first pixel electrode is located between the second pixel electrode and the $n^{th}$ scan line group. The connection electrode is located at a side of the first pixel electrode adjacent to one data line, and the second pixel electrode is electrically connected to the active device group through the connection electrode, wherein the connection electrode, the first pixel electrode, and the second pixel electrode are of the same layer.

The invention further provides a display panel, comprising the aforementioned pixel array substrate, an opposite substrate, and a polymer stabilized alignment liquid crystal layer. The opposite substrate is disposed opposite to the pixel array substrate. The polymer stabilized alignment liquid crystal layer is disposed between the pixel array substrate and the opposite substrate.

Based on the above, in the invention, the opaque elements of the pixel array substrate are disposed around the edges of the pixel structures, and the connection electrode is used for connecting the corresponding pixel electrode to an active device. Thus, in the display panel of the invention having the pixel array substrate, even when disposing a black matrix between each of the pixel structures, the predetermined display aperture ratio will not be affected. In other words, the pixel array substrate and the display panel of the invention can have a good display aperture ratio, and when the display panel is proceeding with 3D displaying, cross talk effect can be avoided.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
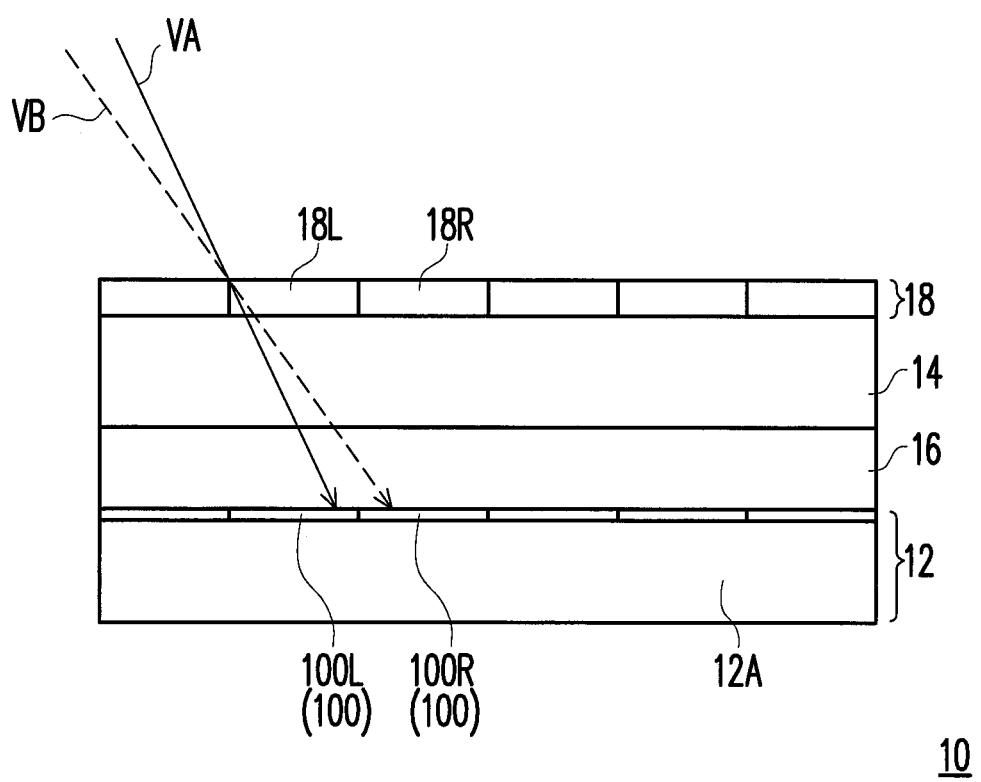
FIG. 1 is a schematic view of a display panel according to an embodiment of the invention.

FIG. 1 is a schematic view of a display panel according to an embodiment of the invention. Referring to FIG. 1, an LCD panel 10 includes a pixel array substrate 12, an opposite substrate 14, a polymer stabilized alignment (PSA) liquid crystal layer 16, and a patterned phase retarder 18. The pixel array substrate 12 is disposed opposite to the opposite substrate 14, and the polymer stabilized alignment liquid crystal layer 16 is disposed between the pixel array substrate 12 and the opposite substrate 14. The pixel array substrate 12, for example, includes a substrate 12A and a plurality of pixel structures 100 shown as arranged in an array on the substrate 12A. In addition, the patterned phase retarder 18 is disposed on the opposite substrate 14, so the display panel 10 has a 3D display function. That is to say, the display panel 10 has a 3D display function when disposed with the patterned phase retarder 18. The display panel 10, however, may not require the patterned phase retarder 18, but then only provides a two-dimensional display function.

In detail, when the display panel 10 displays in 3D display function, a portion of the pixel structures 100, for example the pixel structure 100L, will display a left-eye image, and the other pixel structures 100, for example the pixel structure 100R, will display a right-eye image. The patterned phase retarder 18 has a plurality of retardation areas 18L, 18R. The retardation areas 18L, 18R each provide a specific phase retardation function. The retardation areas 18L and retardation areas 18R are disposed corresponding to the pixel structures 100L and the pixel structures 100R, respectively.

When viewing the images displayed by the display panel 10, polarizing glasses, for example, are worn. The images displayed by the pixel structures 100 may have a first polarizing state after being processed through the retardation area 18L, and be seen by the left eye of the viewer through the left lens of the polarizing glasses. The images displayed by the pixel structures 100 may have a second polarizing state after being processed through the retardation area 18R, and be seen by the right eye of the viewer through the right lens of the polarizing glasses. Thus, the left and right eyes of the viewer can receive different images, so as to construct a 3D image.

Generally, the pixel structure 100L is used to display the left-eye image, and the pixel structure 100R is used to display the right-eye image. When the viewer views images displayed on the display panel 10 through a viewing angle VA, the pixel structures 100L can pass the retardation area 18L so that the left-eye of the viewer only receives the left-eye image displayed by the pixel structures 100L. However, when the viewing angle VA of the viewer is increased to a viewing angle VB, the right-eye image displayed by the pixel structure 100R can also go through the retardation area 18L. Thus, the left eye of the viewer will also receive the right-eye image displayed by the pixel structure 100R, causing an undesirable display effect (generally known as cross talk effect). This is also the main reason why the 3D display technology depends on the viewing angle of a viewer. Thus, the present embodiment provides a pixel array substrate 12 as seen in FIG. 2.

Figure 2:
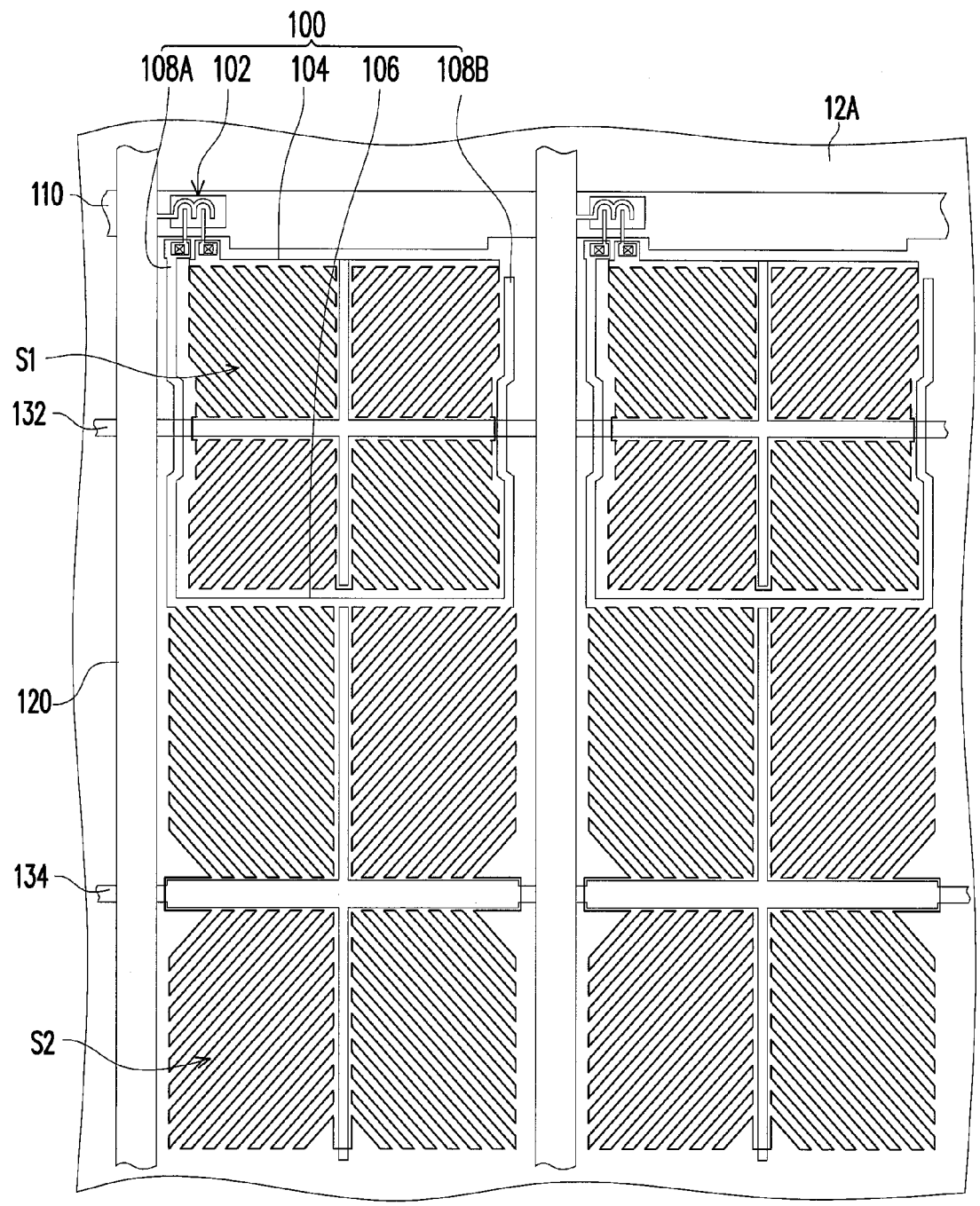
FIG. 2 is a schematic top view of a pixel array substrate according to an embodiment of the invention.

FIG. 2 is a schematic top view of a pixel array substrate according to an embodiment of the invention. Referring to FIG. 2, the pixel array substrate 12 includes a substrate 12A, a plurality of pixel structures 100, a plurality of scan line groups 110, and a plurality of data lines 120. The scan line groups 110 are disposed on the substrate 12A, and the data lines 120 are intersected with the scan line groups 110, wherein the scan line groups 110 in the embodiment are described, for example, as a single conducting wire, but the invention is not limited thereto. The pixel structures 100 are electrically connected to the scan line groups 110 and the data lines 120, wherein each of the pixel structures 100 includes an active device group 102, a first pixel electrode 104, a second pixel electrode 106, a connection electrode 108A, and a coupling electrode 108B.

In the pixel array substrate 12, the active device group 102 of each pixel structure 100 is electrically connected to an $n^{th}$ scan line group 110 and an $m^{th}$ data line 120, wherein n and m are both positive integers. In addition, in the embodiment, the active device group 102 is described, for example, as a dual-drain thin film transistor. The first pixel electrode 104 is electrically connected to the active device group 102. The second pixel electrode 106 is electrically connected to the active device group 102, and the first pixel electrode 104 is located between the second pixel electrode 106 and the corresponding scan line group 110. The connection electrode 108A is located at a side of the first pixel electrode 104 adjacent to one data line 120, and the coupling electrode 108B is located at the other side of the first pixel electrode 104 adjacent to another data line 120. In addition, the second pixel electrode 106 is electrically connected to the active device group 102 through the connection electrode 108A, wherein the connection electrode 108A, the coupling electrode 108B, the first pixel electrode 104, and the second pixel electrode 106 are made of the same film, such as an ITO film.

It should be noted that the connection electrode 108A and the coupling electrode 108B of the embodiment are described, for example, as respectively located on the two opposite sides of the first pixel electrode 104, and the connection electrode 108A and the coupling electrode 108B are electrically connected to the second electrode 106. However, the coupling electrode 108B can be omitted in the pixel structures 100. Namely, in other embodiments, the pixel structures 100 may not include the coupling electrode 108B.

In addition, in order to form the polymer stabilized alignment liquid crystal layer 16 of the display panel 10 through polymer stabilized alignment technology, the first pixel electrode 104 of each pixel structure 100 has, for example, a plurality of slits S1, and the second pixel electrode 106 has a plurality of slits S2, wherein the slits S1 and the slits S2, for example, define four alignment directions. Thus, the polymer stabilized alignment liquid crystal layer 16 of the display panel 10 can show arrangements from a plurality of alignment domains, to achieve a wide-angle display effect. In another embodiment, the liquid crystal layer is not limited to the polymer stabilized alignment liquid crystal, and any suitable liquid crystal can be designed as desired.

More specifically, the pixel array substrate 12 further comprises a first capacitor electrode 132 and a second capacitor electrode 134, respectively located under the first pixel electrode 104 and the second pixel electrode 106. That is to say, the first capacitor electrode 132 is located between the first pixel electrode 104 and the substrate 12A, and the second capacitor electrode 134 is located between the second pixel electrode 106 and the substrate 12A. The first capacitor electrode 132 and the first pixel electrode 104 can form a storage capacitor, and the second capacitor electrode 134 and the second pixel electrode 106 can form another storage capacitor.

In the embodiment, the scan line groups 110 are opaque components, and are located at the edges of the pixel structures 100. Referring to FIG. 2, when the pixel array substrate 12 is applied to the display panel 10, the scan line groups 110 correspond to the boundary of two adjacent pixel structures 100. Thus, when the viewer is viewing at the viewing angle VB, the left eye of the viewer will not see the right-eye image displayed by the pixel structure 100R because of the shielding of the scan line groups 110. That is to say, the scan line groups 110 provide a light-shielding effect to prevent cross talk.

Figure 3:
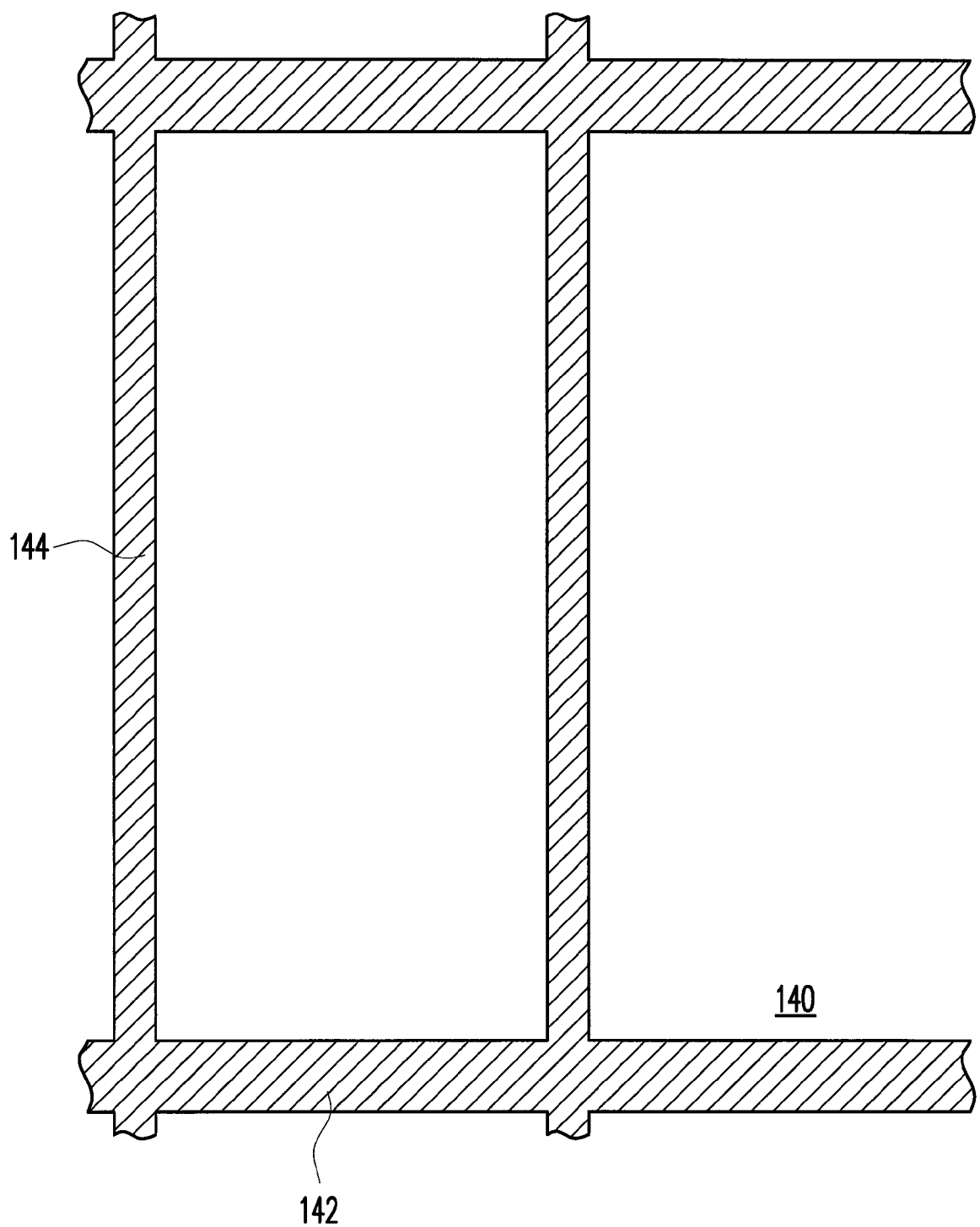
FIG. 3 is a schematic top view of a black matrix according to an embodiment of the invention.

Specifically, FIG. 3 is a schematic top view of a black matrix according to an embodiment of the invention. Referring to FIGS. 2 and 3, in an embodiment, the pixel array substrate 12 can be further disposed with a black matrix 140 as shown in FIG. 3. The black matrix 140 includes a plurality of horizontal portions 142 and a plurality of vertical portions 144. The horizontal portions 142, for example, correspond to the scan line groups 110 of FIG. 2, and the vertical portions 144, for example, correspond to the data lines 120 of FIG. 2. That is to say, the pixel array substrate 12 can be a black matrix on array (BOA) design.

The black matrix 140 can provide a good light-shielding effect, so as to help in enhancing the display contrast in the display panel 10 when the pixel array substrate 12 applies the display panel 10 of FIG. 1. In addition, the black matrix 140 at least overlaps with a portion of the scan line groups 110 and the data lines 120, and the scan line groups 110 and the data lines 120 are originally opaque components. Thus, the disposition of the black matrix 140 will not cause any loss to the display aperture ratio. That is to say, the black matrix 140 can be disposed on the display panel 10 of FIG. 1 for facilitating good display quality under the premise that the display aperture ratio is not reduced. In addition, in other embodiments, the black matrix 140 can also be formed on the opposite substrate 14 of the display panel 10.

Figure 4:
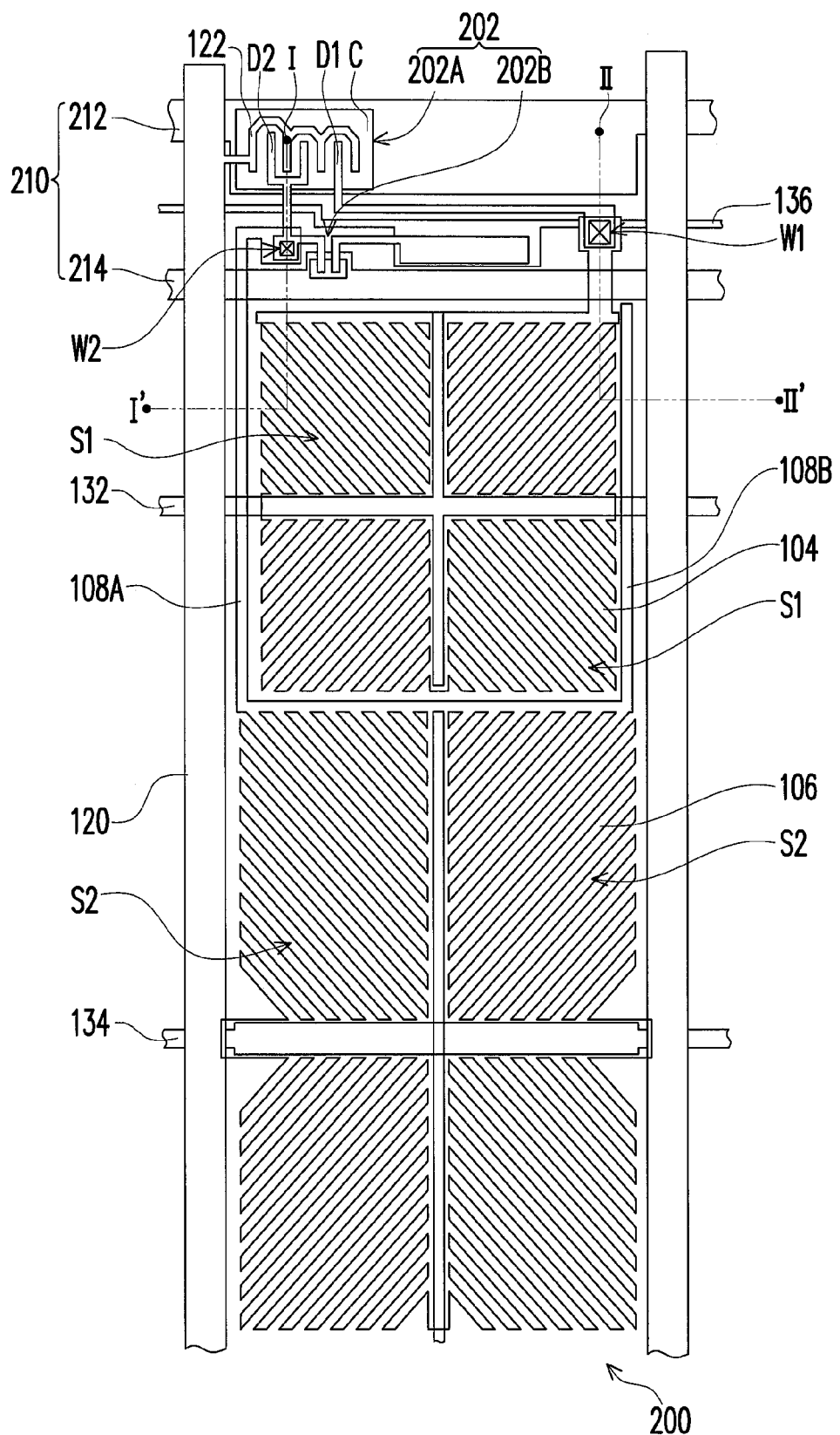
FIG. 4 is a pixel structure according to another embodiment of the invention.

The above pixel structures 100 of the embodiment are only exemplary and are not intended to limit the invention. For example, FIG. 4 is a pixel structure according to another embodiment of the invention. Referring to FIG. 4, a pixel structure 200 is, for example, connected to the scan line group 210 and the data line 120. The scan line group 210 includes a first scan line 212 and a second scan line 214 adjacent to each other. In addition, the pixel structure 200 includes an active device group 202, the first electrode 104, the second electrode 106, the connection electrode 108A, and the coupling electrode 108B, wherein the active device group 202 includes a first active device 202A and a second active device 202B.

The embodiment can also apply the display panel 10 of FIG. 1, thus the first pixel electrode 104 and the second pixel electrode 106 respectively have the plurality of slits S1 and S2, to provide different alignments to achieve a wide-angle display effect, and achieve the formation of the polymer stabilized alignment liquid crystal layer 16. Certainly, the first capacitor electrode 132 and the second capacitor electrode 134 can be disposed under the first pixel electrode 104 and the second pixel electrode 106.

Even though the embodiment only shows one scan line group 210 and one pixel structure 200, when applied to the display panel 10, there are a multiple amount of scan line groups 210 and pixel structures 200. The scan line groups 210 can be arranged in parallel, and the data lines 120 are intersected with the scan line groups 210. The plurality of pixel structures 200 are arranged in an array and connected to the corresponding scan line groups 210 and data lines 120. In addition, in the scan line groups 210, the second scan line 214 of the $n^{th}$ scan line group 210 can be electrically connected to the first scan line 212 of the $(n+1)^{th}$ scan line group 210. In another embodiment, the second scan line 214 of the $n^{th}$ scan line group 210 can be electrically connected to the first scan line 212 of the $(n+2)^{th}$ scan line group 210; that is to say, the second scan line 214 of the $n^{th}$ scan line group can be electrically connected to the first scan line 212 of the $(n+i)^{th}$ scan line group 210, wherein i is a positive integer.

Referring to the pixel structure 200 connected to the $n^{th}$ scan line group 210 and the $m^{th}$ data line 120, the first active device 202A is connected to the corresponding first scan line 212, the corresponding data line 120, the first pixel electrode 104, and the second pixel electrode 106. The second active device 202B is connected to the corresponding second scan line 214 and the second pixel electrode 106. The first active device 202A is a dual-drain thin film transistor having two drains D1, D2, and the first pixel electrode 104 is electrically connected to the drain D1, and the second pixel electrode 106 is electrically connected to the drain D2 through the connection electrode 108A. In addition, the second active device 202B can be connected to the second pixel electrode 106 through the connection electrode 108A. A terminal of the second active device 202B and a third capacitor electrode 136, for instance, are coupled to form a capacitor, wherein the third capacitor electrode 136 is located between the first scan line 212 and the second scan line 214.

The second scan line 214 of the $n^{th}$ scan line group 210 can be electrically connected to the first scan line 212 of the $(n+1)^{th}$ scan line group 210. Thus, the second active device 202B of each pixel structure 200 will be turned on when the next row of pixel structures 200 is turned on. This causes the voltages of the first pixel electrode 104 and the second pixel electrode 106 to be redistributed to achieve better display quality. Thus, even though the first pixel electrode 104 and the second pixel electrode 106 receive different capacitor coupling effects, a good display gray level can still be shown.

Figure 5A:
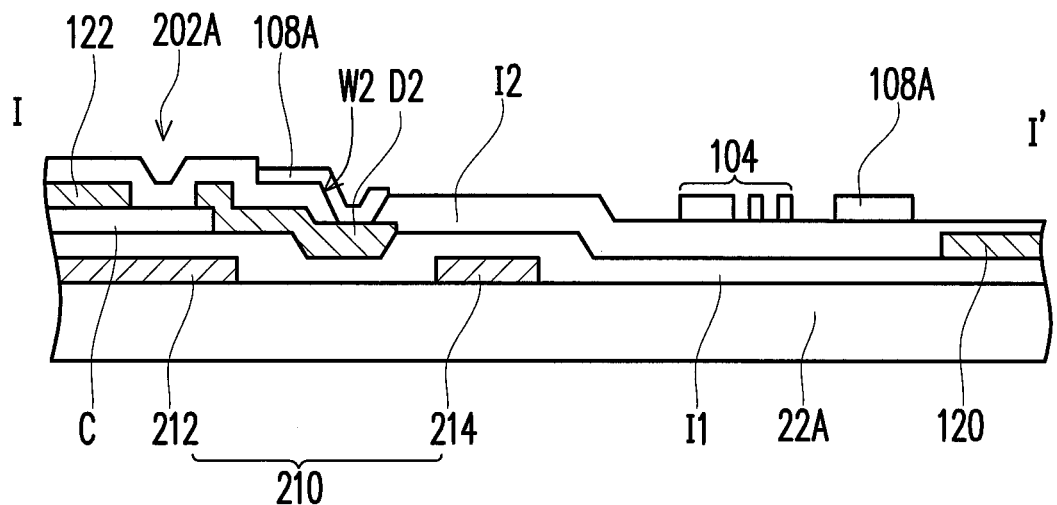
FIGS. 5A and 5B respectively are cross-sectional views along the lines I-I' and II-II' of FIG. 4 according to an embodiment of the invention.
Figure 5B:
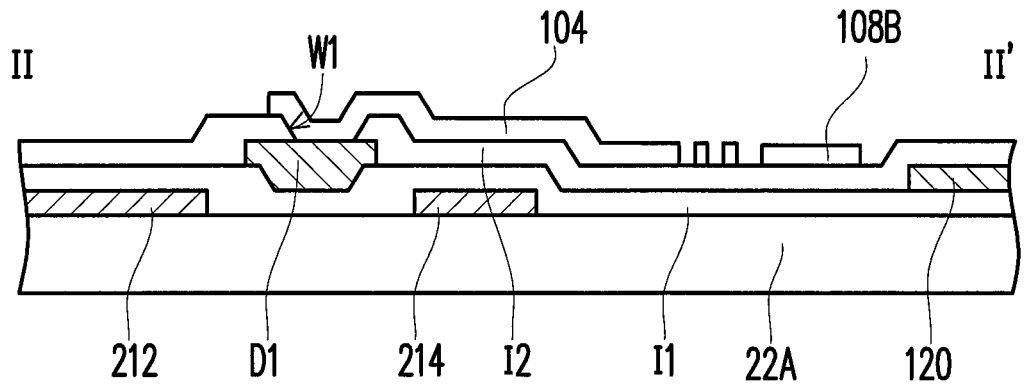

FIGS. 5A and 5B respectively are cross-sectional views along the lines I-I' and II-II' of FIG. 4 according to an embodiment of the invention. Referring to FIG. 4, FIG. 5A, and FIG. 5B, the scan line groups 210, the data lines 120, and the pixel structures 200 are, for example, disposed on a substrate 22A, wherein a portion 122 of the data lines 120 extends out to form the source of the first active device 202A. In addition, the substrate 22A is further disposed with an insulation layer I1, an insulation layer I2, and a channel layer C. The insulation layer I1 covers the first scan lines 212 and the second scan lines 214. The channel layer C is disposed on the insulation layer I1 and is located above the first scan lines 212, wherein the extended portion 122 of the data line 120 and the drains D1, D2 of the first active device 202A are disposed on the channel layer C. The insulation layer I2 covers the scan line groups 210, the data lines 120, and the active device group 202 of each of the pixel structures 200.

In the embodiment, the insulation layer I2 has a first contact opening W1 and a second contact opening W2. The first electrode 104 is electrically connected to the first active device 202A through the first contact opening W1, and the connection electrode 108A is electrically connected to the first active device 202A and the second active device 202B through the second contact opening W2. In addition, the first contact opening W1 and the second contact opening W2 in the embodiment are located between the first scan line 212 and the second scan line 214 of the scan line group 210. In other embodiments, the first contact opening W1 and the second contact opening W2 can be designed to be in any position between the first pixel electrode 104 of each pixel structure 200 and the second pixel electrode 106 of the preceding pixel structure 200. For example, the first contact opening W1 and the second contact opening W2 can be located between the first pixel electrode 104 of one pixel structure 200 and the second scan line 214 of the corresponding scan line group 210. The locations of the first contact opening W1 and the second contact opening W2 are areas that are outside of the pixel electrodes 104 and 106 and not in a display area. Thus, the placement of the first contact opening W1 and the second contact opening W2 do not affect the display aperture ratio of the pixel structure 200. In other words, the embodiment does not need to dispose contact openings in the layout areas of the first pixel electrode 104 and the second pixel electrode 106, and does not need to dispose any contact openings between the first pixel electrode 104 and the second pixel electrode 106 of the same pixel structure 200, thus increasing the display aperture ratio, but the invention is not limited thereto. In other embodiments, the layout areas of the first pixel electrode 104 and the second pixel electrode 106 can be disposed with specific contact openings to show required connection relationships.

Figure 6:
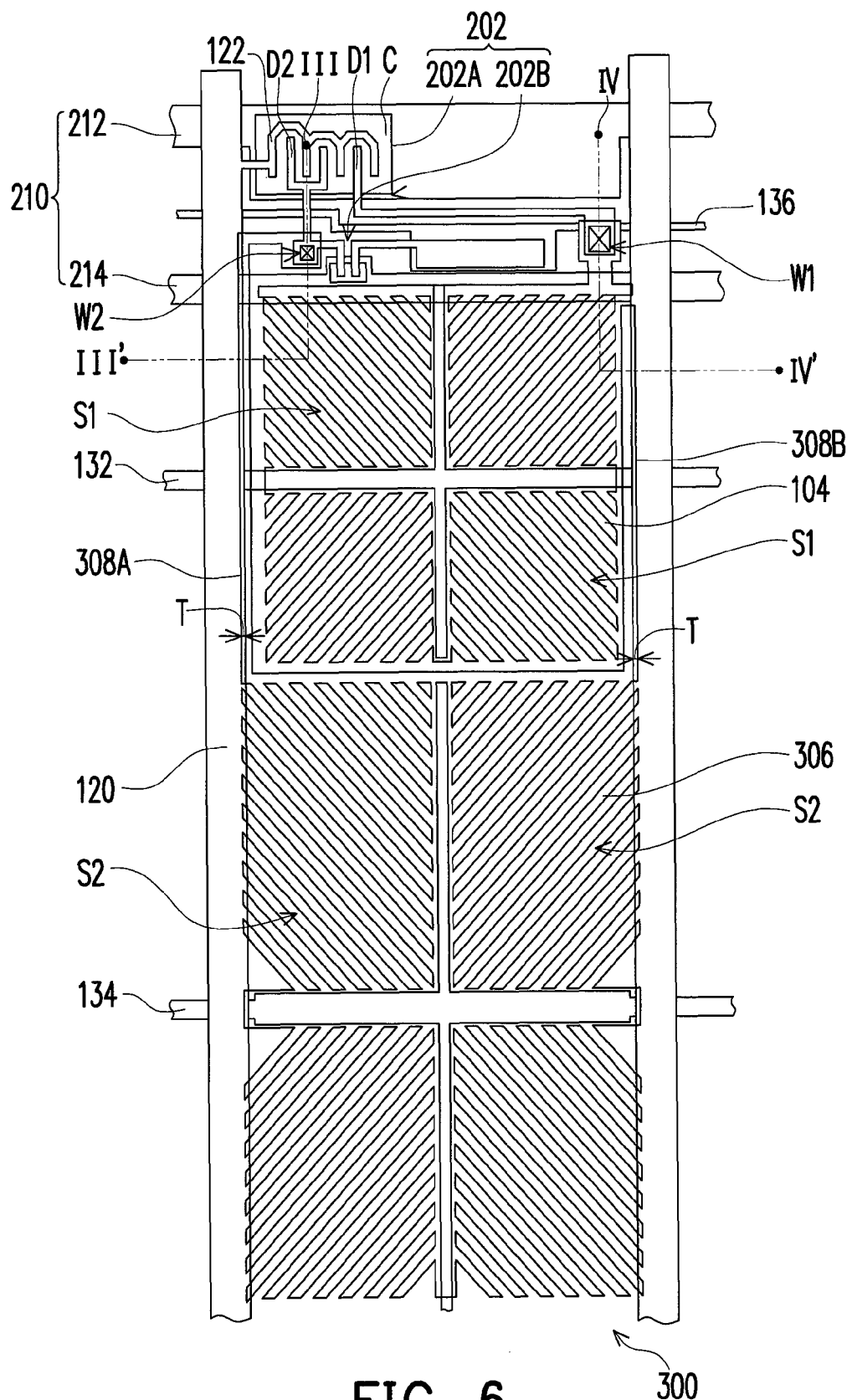
FIG. 6 is a pixel structure according to yet another embodiment of the invention.
Figure 7A:
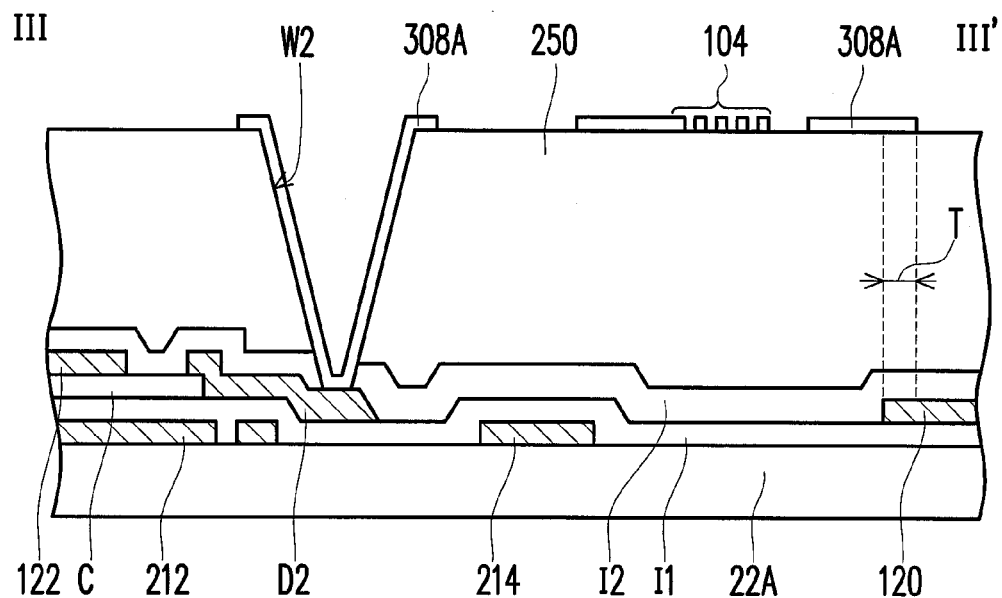
FIGS. 7A and 7B respectively are cross-sectional views along the lines III-III' and IV-IV' of FIG. 6 according to another embodiment of the invention.
Figure 7B:
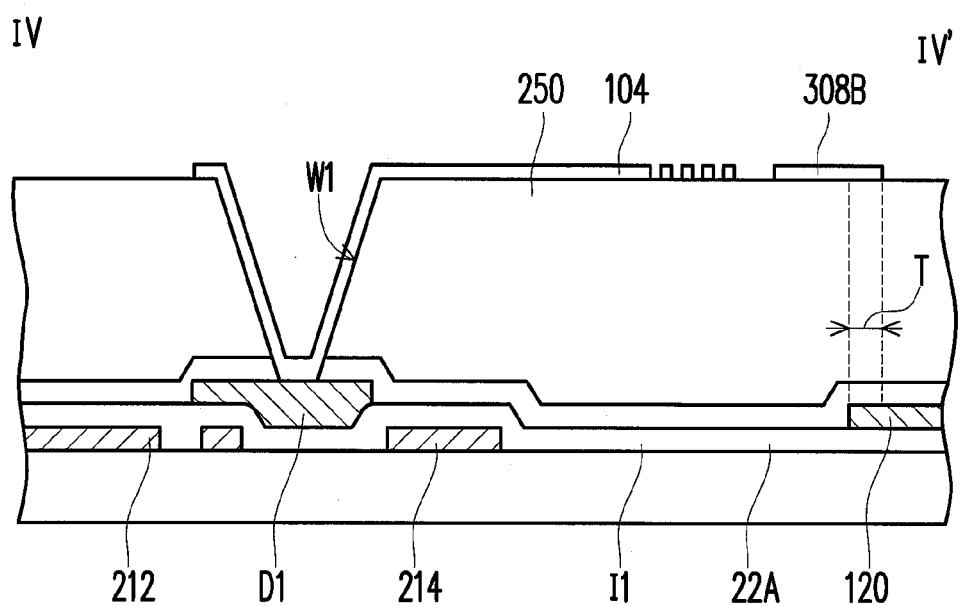

FIG. 6 is a pixel structure according to yet another embodiment of the invention, and FIGS. 7A and 7B respectively are cross-sectional views along the lines III-III' and IV-IV' of FIG. 6. Referring to FIG. 6 according to another embodiment of the invention. Referring to FIG. 7A, and FIG. 7B, a pixel structure 300 of the embodiment is substantially the same as the pixel structure 200 in FIG. 4. Thus, the reference numbers of the components and elements of the embodiment are the same as in FIG. 4, FIG. 5A, and FIG. 5B, and are not repeated hereafter. The main difference between the embodiment and the previous embodiment is that the substrate 22A further includes a color filter layer 250. That is to say, the embodiment is described through a color filter layer on array (COA) design. Certainly, in other embodiments, the color filter layer 250 and the configuration order of other components can be modified to form an array on color filter (AOC) design. In addition, a second pixel electrode 306, a connection electrode 308A, and a coupling electrode 308B, for example, overlap the data lines 120 with an overlapping width T.

In order to provide good color saturation, the color filter layer 250 has a specific thickness. In the embodiment, the first pixel electrode 104, the second pixel electrode 306, the connection electrode 308A, and the coupling electrode 308B are disposed on the color filter layer 250. Thus, the area of the first contact opening W1 and the second contact opening W2 must be moderately enlarged to ensure the connection electrode 308A is electrically connected to the drain D2 and ensure the first pixel electrode 104 is electrically connected to the drain D1. If the first contact opening W1 and the second contact opening W2 are located in the layout area of the first pixel electrode 104 and the second pixel electrode 306, the display aperture ratio will be negatively affected. Thus, the first contact opening W1 and the second contact opening W2 of the embodiment are located in areas not for displaying, which can be between the first scan line 212 and the second scan line 214, so that there is no negative effect towards the display aperture ratio. Even if the first contact opening W1 and the second contact opening W2 needs to increase the areas, the pixel structure 300 of the embodiment will still have a good display aperture ratio.

In addition, since the color filter layer 250 is thicker, the coupling effect of the data lines 120 towards the second pixel electrode 306, the connection electrode 308A, and the coupling electrode 308B is weaker when compared to the embodiment of FIG. 4. Thus, the second pixel electrode 306, the connection electrode 308A, and the coupling electrode 308B can overlap the data lines 120 with the overlapping width T, so as to widen the display area of the pixel structure 300. As a whole, even though the embodiment requires the first contact opening W1 and the second contact opening W2 to have a larger area, a good display aperture ratio can be maintained.

Figure 8:
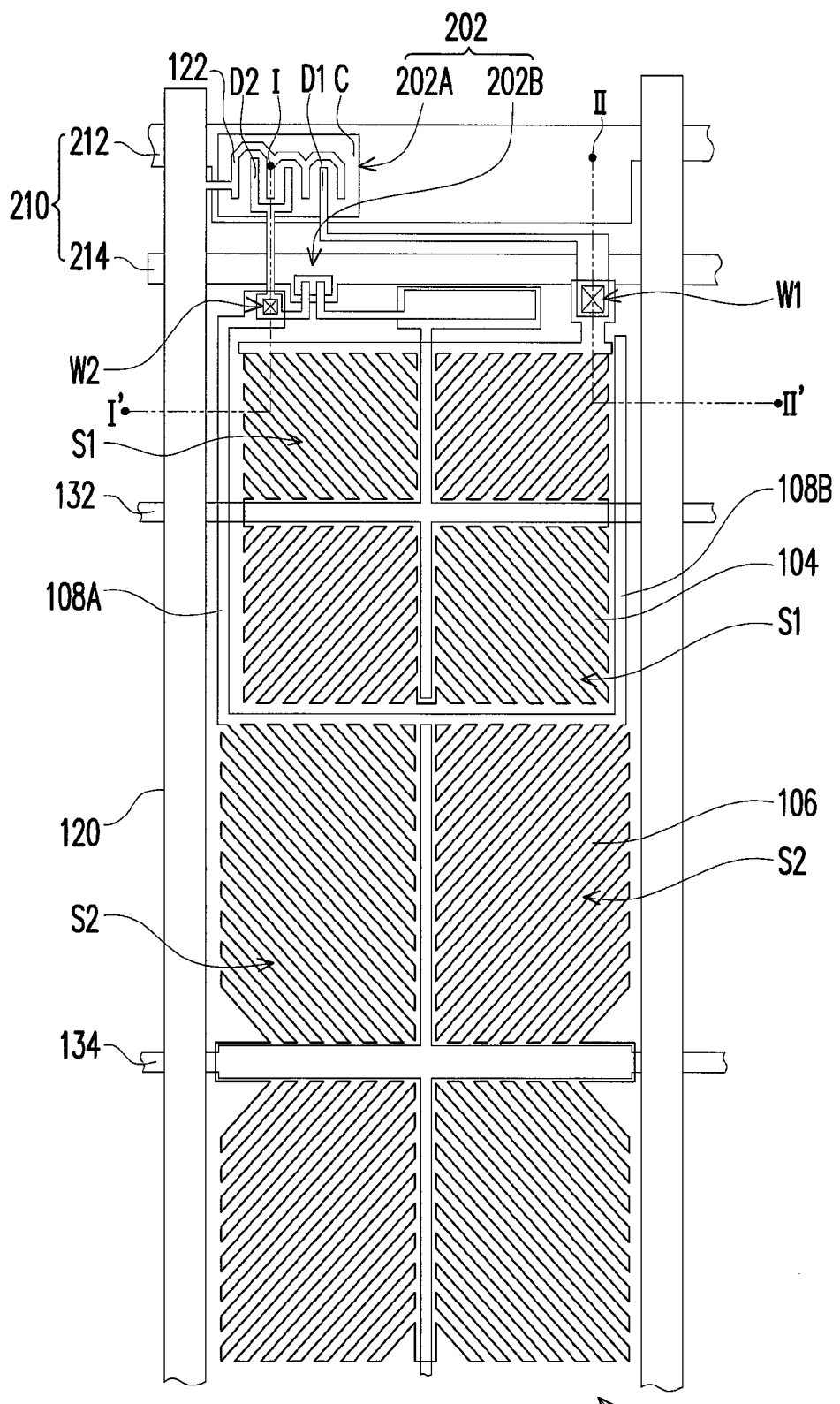
FIG. 8 and FIG. 9 schematically illustrate the pixel structures according to another two embodiments of the invention.
Figure 9:
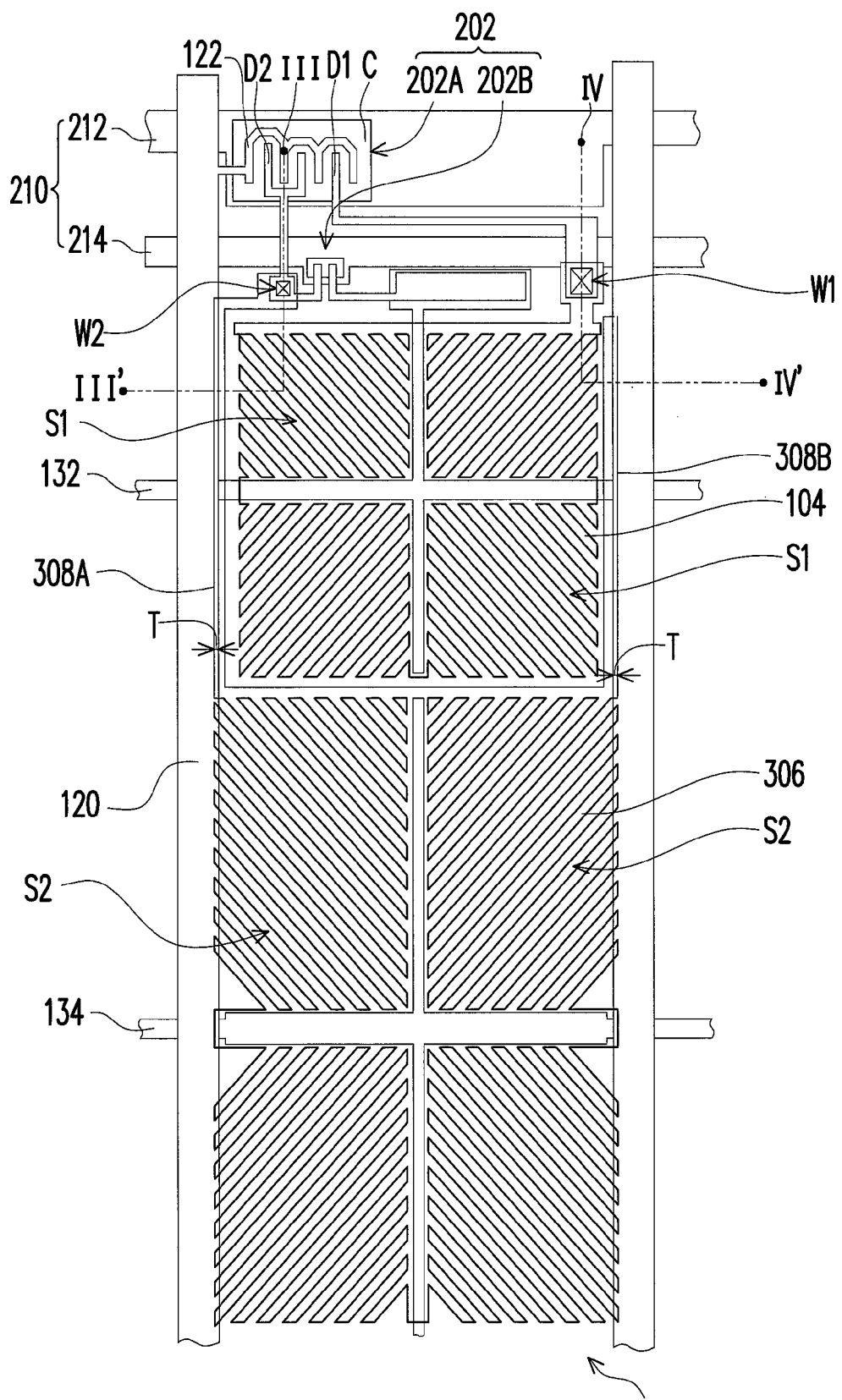

FIG. 8 and FIG. 9 schematically illustrate the pixel structures according to another two embodiments of the invention. Referring to FIG. 8, the pixel structure 400 is substantially similar to the pixel structure 200 depicted in FIG. 4. The difference between the pixel structure 400 and the pixel structure 200 mainly lies in the disposition locations of the first contact opening W1 and the second contact opening W2. Accordingly, the reference numbers of the elements depicted in FIG. 8 can be referred to those depicted in FIG. 4. Specifically, the first contact opening W1 and the second contact opening W2 in the present embodiment are located between the first pixel electrode 104 of the pixel structure 400 and the second scan line 214 of the corresponding scan line group 210.

Furthermore, referring to FIG. 9, the pixel structure 500 is substantially similar to the pixel structure 300 depicted in FIG. 6. The difference between the pixel structure 500 and the pixel structure 300 mainly lies in the disposition locations of the first contact opening W1 and the second contact opening W2. Accordingly, the reference numbers of the elements depicted in FIG. 9 can be referred to those depicted in FIG. 6. Specifically, the first contact opening W1 and the second contact opening W2 in the present embodiment are located between the first pixel electrode 104 of the pixel structure 500 and the second scan line 214 of the corresponding scan line group 210.

In light of the foregoing, the invention disposes light-shielding components around the edges of the pixel structures, and uses the same layer as the pixel electrode to form the connection electrode. Thus, the pixel array substrate can have a good aperture ratio. Specifically, when the pixel array substrate is used in a display panel for 3D displaying, the edges of the pixel structures are already disposed with opaque elements, so even if the pixel edges are disposed with a black matrix, the display panel can still have a good display aperture ratio. More specifically, when the color filter layer is disposed on the pixel array substrate, the coupling function of the data lines is reduced. Thus, the pixel electrodes of the pixel array substrate can further partially overlap the data lines, which is conducive to expanding the display area to have a high aperture ratio.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A pixel array substrate, comprising: a substrate; a plurality of scan line groups, disposed on the substrate, wherein each of the scan line groups comprises a first scan line and a second scan line adjacent to each other; a plurality of data lines intersecting the scan line groups; and a plurality of pixel structures, electrically connected to the scan line groups and the data lines, each of the pixel structures comprising: an active device group, wherein the active device group includes a first active device and a second active device, the first active device is electrically connected to the first scan line of an $n^{th}$ scan line group, and an $m^{th}$ data line, the second active device is electrically connected to the second scan line of the $n^{th}$ scan line group, wherein n and m are both positive integers; a first pixel electrode, electrically connected to the first active device of the active device group; a second pixel electrode, electrically connected to the first active device and the second active device of the active device group, the first pixel electrode being located between the second pixel electrode and the $n^{th}$ scan line group, and the second scan line of the $n^{th}$ scan line group being located between the first pixel electrode and the first scan line of the $n^{th}$ scan line group; and a connection electrode, located at a side of the first pixel electrode adjacent to one data line, and electrically connected the second pixel electrode and the active device group, wherein the connection electrode, the first pixel electrode, and the second pixel electrode are made of the same film.

2. The pixel array substrate as claimed in claim 1, wherein the second scan line of the $n^{th}$ scan line group is electrically connected to the first scan line of the $(n+i)^{th}$ scan line group, and i is a positive integer.

3. The pixel array substrate as claimed in claim 1, wherein the first active device is a dual-drain thin film transistor having two drains, the first pixel electrode is electrically connected to one drain, and the second pixel electrode is electrically connected to the other drain through the connection electrode.

4. The pixel array substrate as claimed in claim 3, wherein the second active device is electrically connected to the second pixel electrode through the other drain of the first active device.

5. The pixel array substrate as claimed in claim 1, further comprising an insulation layer, disposed on the substrate, covering the scan line groups, the data lines, and the active device group of each of the pixel structures.

6. The pixel array substrate as claimed in claim 5, wherein the insulation layer has a first contact opening and a second contact opening, the first pixel electrode is electrically connected to the first active device through the first contact opening, and the connection electrode is electrically connected to the first active device and the second active device through the second contact opening.

7. The pixel array substrate as claimed in claim 6, wherein the first contact opening and the second contact opening are located between the first scan line and the second scan line of the $n^{th}$ scan line group.

8. The pixel array substrate as claimed in claim 6, wherein the first contact opening and the second contact opening are located between the first pixel electrode of one pixel structure and the second pixel electrode of a preceding pixel structure.

9. The pixel array substrate as claimed in claim 6, wherein the first contact opening and the second contact opening are located between the first pixel electrode of one pixel structure and the second scan line of the corresponding scan line group.

10. The pixel array substrate as claimed in claim 1, wherein each of the pixel structures further includes a coupling electrode, located on the other side of the first pixel electrode adjacent to another data line, and the coupling electrode is electrically connected to the second pixel electrode, wherein one side of the first pixel electrode is not surrounded by an electrode directly connected to the coupling electrode and the connection electrode.

11. The pixel array substrate as claimed in claim 10, wherein the coupling electrode and the second pixel electrode are made of the same film.

12. The pixel array substrate as claimed in claim 1, further comprising a color filter layer, disposed on the substrate.

13. The pixel array substrate as claimed in claim 1, further comprising a black matrix layer, disposed on the substrate, and at least partially overlapping with the scan line groups and the data lines.

14. The pixel array substrate as claimed in claim 1, wherein the second pixel electrode of the each of the pixel structures partially overlaps with at least one of the adjacent data lines.

15. The pixel array substrate as claimed in claim 14, wherein the connection electrode partially overlaps with at least one of the adjacent data lines.

16. The pixel array substrate as claimed in claim 1, wherein the first pixel electrode and the second pixel electrode of the each of the pixel structures respectively have a plurality of slits to define at least four alignment directions.

17. A display panel, comprising: the pixel array substrate according to claim 1; an opposite substrate, disposed opposite to the pixel array substrate; and a polymer stabilized alignment liquid crystal layer, disposed between the pixel array substrate and the opposite substrate.

18. The display panel as claimed in claim 17, further comprising a patterned phase retarder, disposed on the opposite substrate, wherein the patterned phase retarder includes a plurality of phase retardation areas, and each of the phase retardation areas corresponds to one of the pixel structures.

* * * * *